United States Patent [19]

Funami et al.

[11] Patent Number: 4,965,297

[45] Date of Patent: Oct. 23, 1990

[54] RESIN COMPOSITION AND METHOD FOR ITS PREPARATION

[75] Inventors: Fumiyasu Funami, Yokohama; Akira Kitsunezuka, Koga; Shigeharu Arai, Saitama; Nobuhiro Sakuma, Ibaraki; Atsuo Okawara, Sagamihara; Tomiya Sugiura, Yokohama, all of Japan

[73] Assignee: Asahi Fiber Glass Company Limited, Tokyo, Japan

[21] Appl. No.: 427,954

[22] Filed: Oct. 25, 1989

Related U.S. Application Data

[63] Continuation of Ser. No. 337,853, Apr. 14, 1989, abandoned.

[30] Foreign Application Priority Data

May 31, 1988 [JP] Japan .................................. 63-131457
Jun. 10, 1988 [JP] Japan .................................. 63-141577
Jun. 14, 1988 [JP] Japan .................................. 63-144826

[51] Int. Cl.$^5$ ................................................ C08K 9/02
[52] U.S. Cl. ....................................... 523/217; 524/414; 523/216
[58] Field of Search ......................... 523/217; 524/414

[56] References Cited

U.S. PATENT DOCUMENTS

4,212,793  7/1980  Shue ..................................... 414/524

OTHER PUBLICATIONS

Patent Abstracts of Japan, vol. 12, No. 164 (C-496) [3012], May 18, 1988; & JP-A-62 275 158 (Dainippon Ink. & Chem, Inc.) 30-11-1987.

*Primary Examiner*—Joseph L. Schofer
*Assistant Examiner*—John J. Guarriello
*Attorney, Agent, or Firm*—Oblon, Spivak, McClelland, Maier & Neustadt

[57] ABSTRACT

A resin composition comprising polyphenylene sulfide and hypophosphorous acid or its salt.

5 Claims, No Drawings

RESIN COMPOSITION AND METHOD FOR ITS PREPARATION

This application is a continuation of application Ser. No. 07/337,853, filed on Apr. 14, 1989, now abandoned.

The present invention relates to a resin composition comprising a polyphenylene sulfide resin as the main component and a method for its preparation.

A thermoplastic resin composed essentially of polyphenylene sulfide (hereinafter sometimes referred to simply as PPS) is excellent in the heat resistance, dimensional stability, chemical resistance and flame retardancy, and it is used as an engineering plastic material for various applications.

PPS may be used by itself for molding films or fibers. However, it is more common to use it in combination with a reinforcing fiber such as glass fiber or other fillers such as talc, calcium carbonate or glass beads. As such PPS, a linear type and a cross-linked type are known.

A thermoplastic resin composed essentially of PPS has a drawback that it is poor in the impact resistance, although it is excellent in the heat resistance, dimensional stability, chemical resistance and flame retardancy. Further, PPS has a drawback that when heated during the molding process, it tends to undergo discoloration. This tendency is remarkable with the cross-linked type.

It is an object of the present invention to solve such problems inherent to the PPS thermoplastic resin an to provide a PPS resin composition having high impact strength and minimum tendency for discoloration and a method for its preparation.

The present invention provides a resin composition comprising a polyphenylene sulfide resin and hypophosphorous acid or its salt.

The present invention also provides a method for preparing a resin composition, which comprises uniformly mixing a filler containing hypophosphorous acid or its salt to a melt of a polyphenylene sulfide resin.

Now, the present invention will be described in further detail with reference to the preferred embodiments.

Hypophosphorous acid or its salt (hereinafter referred to simply as the compound of the present invention) includes hypophosphorous acid, sodium hypophosphite, potassium hypophosphite, calcium hypophosphite, magnesium hypophosphite and zinc hypophosphite. Preferred are hypophosphites, particularly calcium hypophosphite an sodium hypophosphite.

The resin composition of the present invention may be molded by itself into films or fibers. Otherwise, a reinforcing material such as glass fiber or other filler may be incorporated thereto to form FTP (Fiber-Reinforced Thermoplastics), which is then molded into pellets, semi-processed products (such as rods or sheets) or final products.

The polyphenylene sulfide may be of the linear type or the cross-linked type.

The polyphenylene sulfide resin of the present invention may be a polymer alloy of PPS containing a thermoplastic resin such as polytetrafluoroethylene or polyethylene, as a subordinate resin component, in an amount of from 0.1 to 50% by weight based on the total resin. Namely, for the purpose of the present invention, the polyphenylene sulfide resin includes such a polymer alloy.

The compound of the present invention is incorporated usually in an amount of from 0.01 to 5% by weight, preferably from 0.05 to 3% by weight, based on the resin composition. If the amount is too small, no adequate improvement of the impact resistance will be obtained, and the effects for preventing discoloration tend to be inadequate. On the other hand, if the amount is excessive, no further increase in the effects is expected, and use of such an excessive amount is simply uneconomical.

However, it is rather difficult to uniformly disperse such a small amount of the compound of the present invention in a melt of a polyphenylene sulfide resin. According to the method of the present invention, a filler containing the compound of the present invention is mixed to a melt of the polyphenylene sulfide resin to facilitate the dispersion and thereby to overcome the difficulty.

The filler useful for this purpose includes a reinforcing material such as glass fiber and glass beads.

The filler preferably contains from 0.01 to 1.5% by weight, preferably from 0.05 to 1% by weight, of the compound of the present invention. If the amount is too small, no adequate effects will be obtained for the improvement of the impact resistance, for the prevention of discoloration or decrease in the strength. On the other hand, if the amount is excessive, no further increase in the effects is expected, and use of such an excessive amount is simply uneconomical.

In a preferred embodiment, the compound of the present invention is attached on the surface of glass fiber strand for reinforcement. As such glass fiber strand, there may be employed a strand obtained by applying a known sizing agent to glass fiber, followed by bundling.

There is no particular restriction as to the manner for attaching the compound of the present invention to the glass fiber strand. For example, a solution containing the compound of the present invention may be sprayed on the glass fiber strand, or such a solution may be coated on the glass fiber strand by means of a roll coater, whereby the total amount of the compound to be incorporated can be reduced. It is also possible to employ a sizing agent containing the compound of the present invention.

The application of the above solution is preferably conducted under a dry state where the water content of the glass fiber strand is relatively small (preferably at most 5% by weight). As mentioned above, the amount of the compound of the present invention to be attached on the surface of the glass fiber strand is preferably from 0.05 to 1.5% by weight, more preferably from 0.1 to 0.8% by weight, relative to the glass fiber. If the amount is too small, no adequate effects will be obtained for the improvement of the impact strength and for the prevention of discoloration or decrease in the strength. On the other hand, if the amount is excessive, no increase in the effects can be expected, and use of such an excessive amount is simply uneconomical.

When the compound of the present invention is incorporated in a sizing agent, the concentration of the compound of the present invention in the sizing agent is preferably from 0.5 to 15% by weight, more preferably from 1 to 10% by weight.

The filler is dried to a water content of not higher than 0.1% by weight and then incorporated usually in an amount of from 1 to 80% by weight based on the polyphenylene sulfide resin. When the filler is a reinforcing material such as glass fiber, it is preferably incorporated in an amount of from 2 to 80% by weight based on the polyphenylene sulfide resin.

Such filler is mixed to the polyphenylene sulfide resin in a molten state, and the mixture is formed into pellets, semi-processed products or final products, in accordance with a conventional method. Further, it is possible to form pellets first, and then semi-processed products or final products may be prepared from such pellets.

It is believed that when the filler is mixed with a melt of the polyphenylene sulfide resin, the compound contained in the filler diffuses into the resin and the serves to arrange PPS molecules and change the crystal structure to improve the impact resistance and to prevent the decomposition of PPS or formation of discolored components under heating. However, the exact mechanism has not yet been understood. Further, the concentration of the compound of the present invention is believed to be high at the interface of the filler, particularly at the interface of the glass fiber strand, to achieve the effect of the present invention more effectively than a case where the compound of the present invention is simply imformly dispersed in the polyphenylene sulfide resin without a filler.

Now, the present invention will be described in further detail with reference to Examples. However, it should be understood that the present invention is by no means restricted to such specific Examples.

EXAMPLE 1

60 parts by weight of PPS (KPS#214, tradename, manufactured by Kureha Chemical Industries Company Limited), 0.5 part by weight of calcium hypophosphite and 40 parts by weight of chopped glass fiber strand (#03 MA FT525, manufactured by Asahi Fiber Glass Company Limited) were mixed and pelletized in a conventional manner. The heating temperature was 320° C.

These pellets were injection-molded to obtain three test pieces. The color shade ($\Delta E$) was measured in accordance with JIS Z-8722. The results are shown in Table 1.

Separately, with respect to five test pieces, the notched impact strength was measured in accordance with ASTM D-256. The results are also shown in Table 1.

COMPARATIVE EXAMPLE 1

The test was conducted in the same manner as in Example 1 by using 60 parts of the same PPS as used in Example 1 and 40 parts of the same chopped strand as used in Example 1. The results are shown in Table 1.

TABLE 1

|  | Example 1 | Comparative Example 1 |
|---|---|---|
| Color shade ($\Delta E$) | 27.4 | 43.4 |
| Impact strength (kg-cm/cm) | 11.3 | 8.7 |

EXAMPLE 2

60 parts by weight of PPS (KPS#214, tradename, manufactured by Kureha Chemical Industries Company Limited), and 40 parts by weight of chopped glass fiber strand obtained by using an epoxy sizing agent containing 3% by weight of calcium hypophosphite (content of calcium hypophosphite in the chopped strand: 0.3% by weight) were mixed and pelletized in a conventional manner. The heating temperature was 320° C.

The pellets were injection molded to obtain three test pieces. The color shade ($\Delta E$) was measured in accordance with JIS Z-8722. The results are shown in Table 2.

With respect to five test pieces, the notched impact strength was measured in accordance with ASTM D-256. The results are shown in Table 2.

This strength is higher than the case where 0.5% by weight of the compound of the present invention is simply mixed in PPS.

COMPARATIVE EXAMPLE 2

The test was conducted in the same manner as in Example 1 by using 60 parts of the same PPS as used in Example 1 and 40 parts by weight of the same chopped strand obtained by using the sizing agent containing no calcium hypophosphite. The results are shown in Table 2.

TABLE 2

|  | Example 2 | Comparative Example 2 |
|---|---|---|
| Color shade ($\Delta E$) | 27.0 | 43.4 |
| Impact strength (kg-cm/cm) | 12.8 | 8.7 |

EXAMPLE 3

60 parts by weight of PPS (KPS#214, tradename, manufactured by Kureha Chemical Industries Company Limited) and 40 parts by weight of chopped glass fiber strand obtained by coating a 2 wt% calcium hypophosphite solution on the surface of a glass fiber strand obtained by using an epoxy sizing agent (amount of calcium hypophosphite coated: 0.2% by weight based on the glass fiber) and cutting and drying the glass fiber strand, were mixed and pelletized in a conventional manner. The heating temperature was 320° C.

The pellets were injection-molded to form three test pieces. The color shade ($\Delta E$) was measured in accordance with JIS Z-8722. The results are shown in Table 3.

With respect to five test pieces, the notched impact strength was measured in accordance with ASTM D-256. The results are shown in Table 3.

This strength was higher than the case where 0.5% by weight of the compound of the present invention is simply mixed in PPS.

COMPARATIVE EXAMPLE 3

The test was conducted in the same manner as in Example 3 by using 60 parts by weight of the same PPS as used in Example 3 and 40 parts by weight of the same chopped strand containing no calcium hypophosphite. The results are shown in Table 3.

TABLE 3

|  | Example 3 | Comparative Example 3 |
|---|---|---|
| Color | 26.5 | 43.4 |

TABLE 3-continued

|  | Example 3 | Comparative Example 3 |
| --- | --- | --- |
| shade (ΔE) | | |
| Impact strength (kg-cm/cm) | 13.0 | 8.7 |

As described in the foregoing, the present invention effectively improves the impact strength and prevents discoloration and deterioration in the strength of a polyphenylene sulfide resin.

We claim:

1. A method for preparing a resin composition, which comprises: uniformly mixing glass fiber strands having hypophosphorous acid or its salt attached to the surface thereof, in a melt of a polyphenylene sulfide resin.

2. The method according to claim 1, wherein the amount of hypophosphorous acid or its salt attached to the surface of the glass fiber strand ranges from 0.01 to 1.5% by weight based on the strand.

3. The method according to claim 1, wherein the amount of hypophosphorous acid or its salt attached to the surface of the glass fiber strand ranges from 0.1 to 0.8% by weight based on the strand.

4. The method according to claim 1, wherein the amount of the glass fiber strand ranges from 2 to 80% by weight based on the polyphenylene sulfide resin.

5. The method of claim 1, wherein the salt of hypophosphorous acid is calcium or sodium hypophosphite.

* * * * *